United States Patent [19]

King

[11] Patent Number: 4,903,586
[45] Date of Patent: Feb. 27, 1990

[54] COFFEE BREWER

[76] Inventor: Alan M. King, 465 Cote St. Antoine Rd., Westmount, Quebec, Canada, H3Y 2K1

[21] Appl. No.: 236,797

[22] Filed: Aug. 26, 1988

Related U.S. Application Data

[63] Continuation-in-part of Ser. No. 90,160, Aug. 27, 1987, Pat. No. 4,632,023.

[51] Int. Cl.$^4$ ............................................. A47J 31/32
[52] U.S. Cl. .................................... 99/287; 99/289 R
[58] Field of Search ................. 99/279, 289 R, 289 T, 99/287, 297, 323.1; 426/433

[56] References Cited

U.S. PATENT DOCUMENTS

| 3,552,976 | 1/1971 | King . | |
|---|---|---|---|
| 3,565,641 | 2/1971 | King . | |
| 4,193,321 | 3/1980 | King . | |
| 4,305,328 | 12/1981 | Kueser | 99/283 |
| 4,632,023 | 12/1986 | King . | |
| 4,694,739 | 9/1987 | Daintrey et al. . | |

Primary Examiner—Robert W. Jenkins
Attorney, Agent, or Firm—Hill, Van Santen, Steadman & Simpson

[57] ABSTRACT

A beverage brewing machine which has upper and lower brewing chambers which are moveable relative to each other so as to clamp a strip-shaped filter therebetween during the brewing process and the chambers can be separated so as to allow the filter strip to be removed from the brewing chamber and the beverage residual wiped therefrom after which the filter strip is returned to the brewing chambers which are then resealed for the next cycle. A hold down grid engages the top surface of the filter to hold it down as a piston moves in the lower chamber upwardly to force air through the filter to agitate the beverage. When the piston reaches top dead center, the hold down grid is lifted. When the piston passes the opening the brewed coffee is poured. A loose connection is provided between the connecting rod for the piston and the driving crank arm so that the piston remains longer at the top and bottom of its stroke. Due to agitation of ground and oxygenation of the mixture, or a combination of both, by adding a high volume of air during the brewing process, increased extraction results.

4 Claims, 6 Drawing Sheets

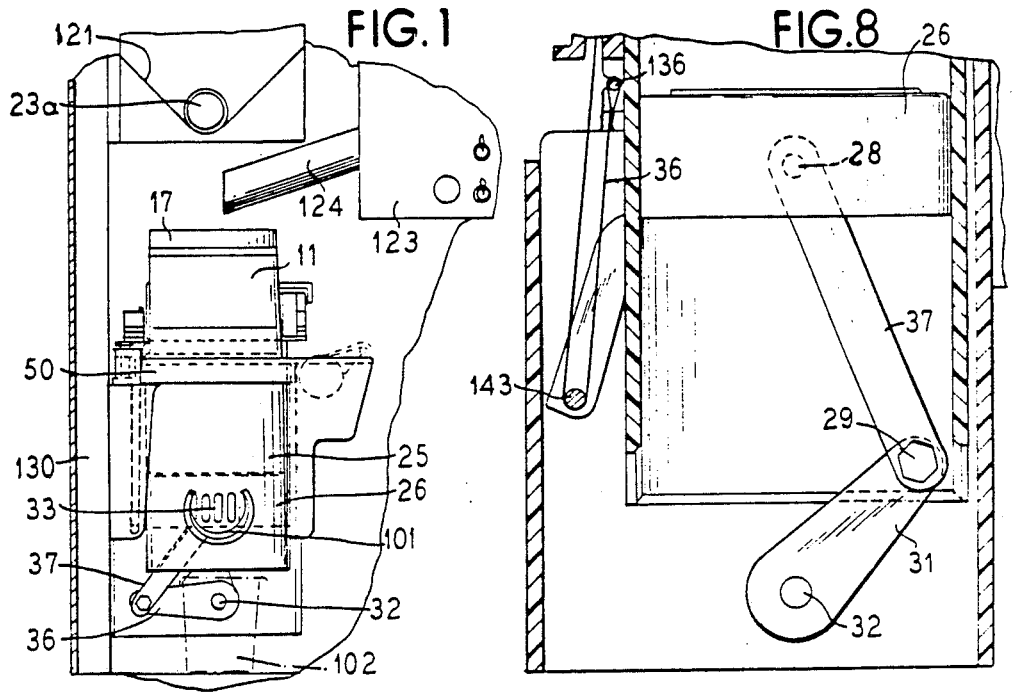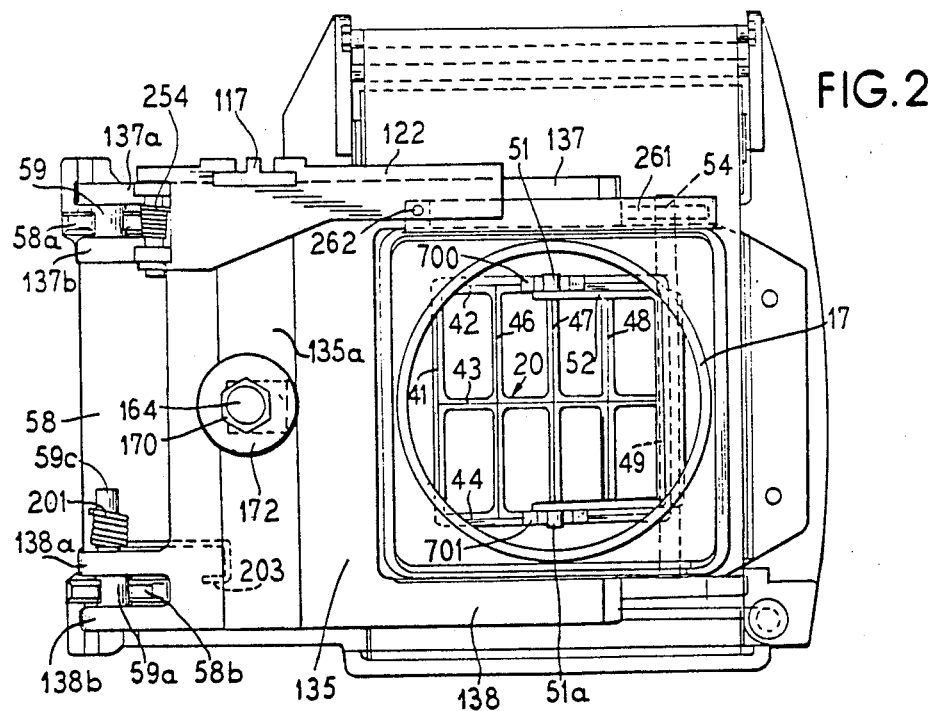

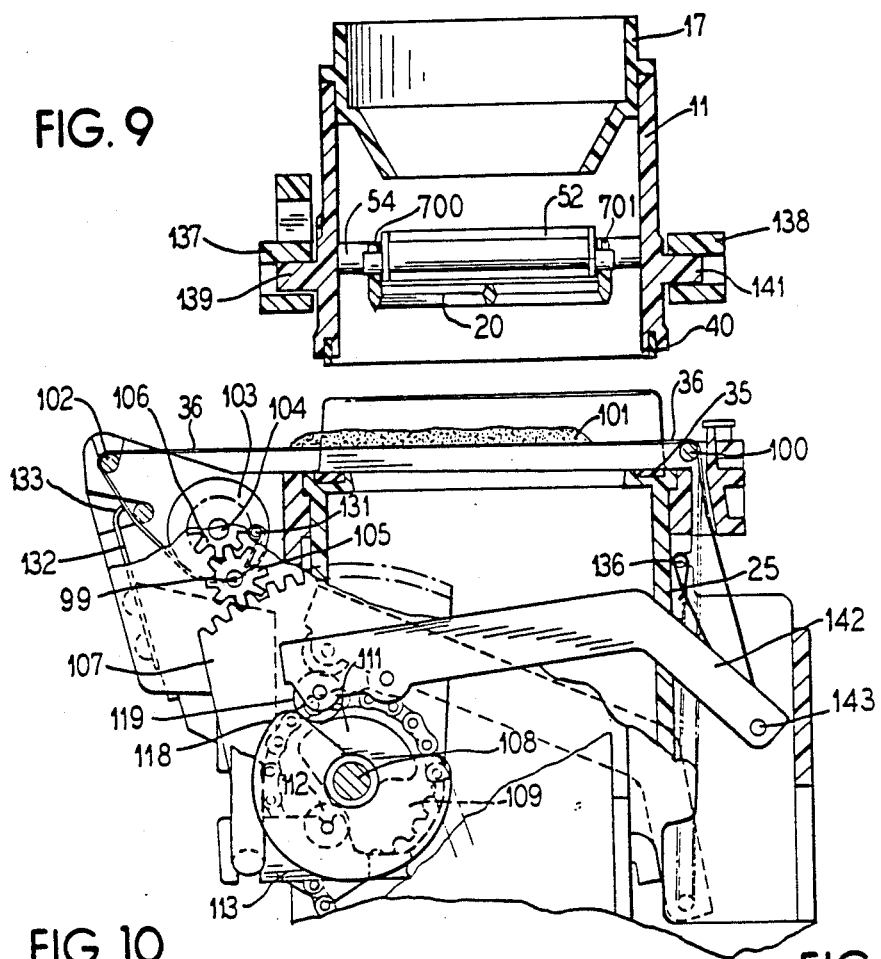

COFFEE BREWER

CROSS-REFERENCES TO RELATED APPLICATIONS

This application is related to the patent entitled "COFFEE BREWER" of which Alan M. King is the inventor, U.S. Pat. No. 4,632,023 which issued in Dec. 30, 1986 and is a Continuation-in-Part of Application Ser. No. 090,160 filed Aug. 27, 1987.

BACKGROUND OF THE INVENTION

1. Field of the Invention

This invention relates in general to coffee or other beverage brewers, and in particular to an improvement in beverage brewing machines wherein the filter element can be repetitively used and can be removed from the brewing chamber so that the coffee grounds can be removed therefrom and then the filter element can be returned to the brewing chamber.

2. Description of the Prior Art

The present invention is an improvement in beverage brewing machines such as disclosed in U.S. Pat. No. 3,565,641 which issued on Feb. 23, 1971 wherein the inventor is Alan M. King. This patent discloses a beverage brewing vending machine for brewing a single cup of coffee or other beverage which has a brewing chamber which receives hot water and beverage material. The chamber has a floor through which gas and liquid can pass but is provided with a filter which prevents the beverage material from passing therethrough. The apparatus disclosed in U.S. Pat. No. 3,565,641 has a lower chamber which is of substantially the same cross-sectional size as the first chamber located below the first chamber in which a piston is mounted. The piston can be moved upwardly toward the first chamber which forces air through the floor of the first chamber into the first chamber so as to agitate and brew the hot water and beverage material mixture to produce the beverage. The piston then moves away from the floor of the top chamber and draws the beverage through the floor and filter and then dispenses it through a suitable spout. In the apparatus of U.S. Pat. No. 3,565,641, the filter material is not reused but a supply of filter material is supplied to the brewing chamber for each individual cup of coffee and then is discarded.

SUMMARY OF THE INVENTION

It is an object of the present invention to provide a beverage brewing machine which allows the same filter material to be reused repetitively and provides for the upper chamber being raised from the lower brewing chamber during which time the filter material in the brewing chamber and the residue from the prior cup of beverage passes out of the brewing chamber and is scraped from the filter material after which the filter material is then returned to the brewing chamber and the upper brewing chamber then rests against the lower brewing chamber so as to provide a seal.

Another object of the invention is to provide a lever operated grid hold down mechanism which during the portion of the brewing operation when the piston is moving upwards to the top of the cylinder, engages and holds the filter down, and is removed from engagement with the filter material when the piston reaches top dead center and remains at its maximum distance from the said filter material during the balance of the brewing cycle.

It is yet another object of the invention to provide an improved brewing machine which allows the filter material to be reused but which provides the option to remove the reusable filter material and use instead a non-reusable paper filter material.

Another object of the invention is to provide a brewing machine wherein a large portion of the brewing cycle is used for drawing coffee through the filter and agitating the beverage and where there is very limited time of the cycle for raising the upper chamber and holding it up and removing the grounds and filter material out of the brewing chamber and returning the filter material to the brewing chamber and lowering the upper chamber and the hold down grid.

Another object is to provide a positively driven filter material web which is returned to the brewing chamber.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure.

BRIEF DESCRIPTION OF THE DRAWINGS

FIG. 1 is a view illustrating the beverage brewing machine of the invention;

FIG. 2 is a top view of the beverage brewing machine;

FIG. 8 is a partially cut-away sectional view taken on line VIII—VIII in FIG. 5 illustrating the pull down lever;

FIG. 9 illustrates the filter medium drive;

FIG. 10 illustrates a modification of the invention;

FIG. 11 illustrates the modification of FIG. 10.

DESCRIPTION OF THE PREFERRED EMBODIMENTS

Figure 3:
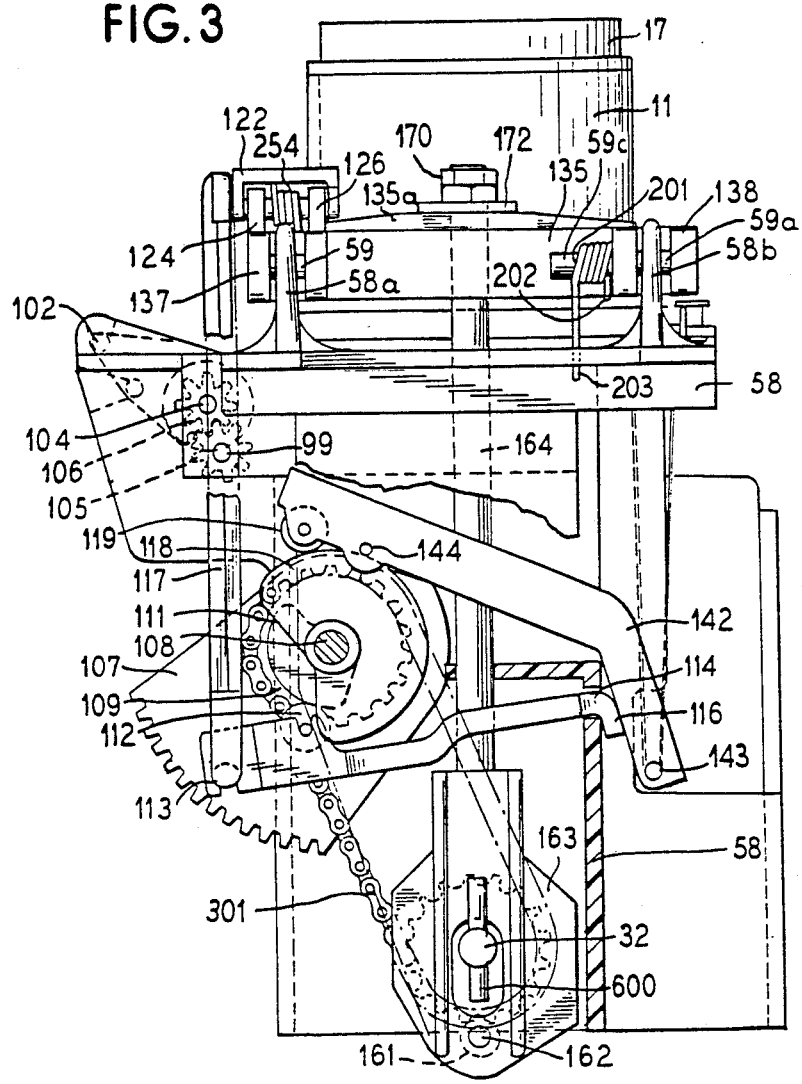
FIG. 3 is a partially cut-away side view illustrating the beverage machine.

FIG. 1 illustrates the structure of the present machine which comprises a frame member 130 with a coffee dispenser 121 mounted thereon with an opening 123a and which has a suitable check mechanism such as well known to those skilled in the art which upon demand deposits coffee into an upper brewing chamber 11 which cooperates with a lower brewing chamber 25. Hot water is dispensed from a reservoir 123 which has a suitable heater and a spout 124 for providing one cup of hot water into the funnel 17 of the top brewing chamber 11 where it is agitated by the action of a piston 26 mounted in the lower chamber 25 to brew coffee. After the coffee has been brewed, it is drawn through a filter and passes out openings 33 to a spout 101 to a cup 102 for use.

Figure 4:
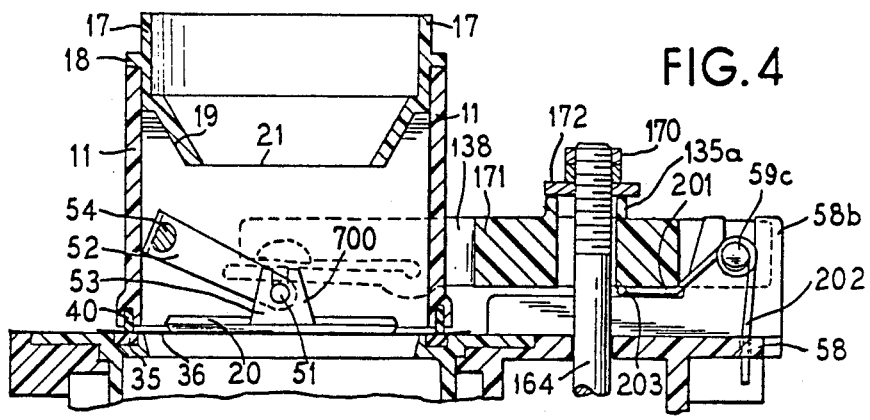
FIG. 4 is a partially sectional view of the beverage machine.
Figure 5:
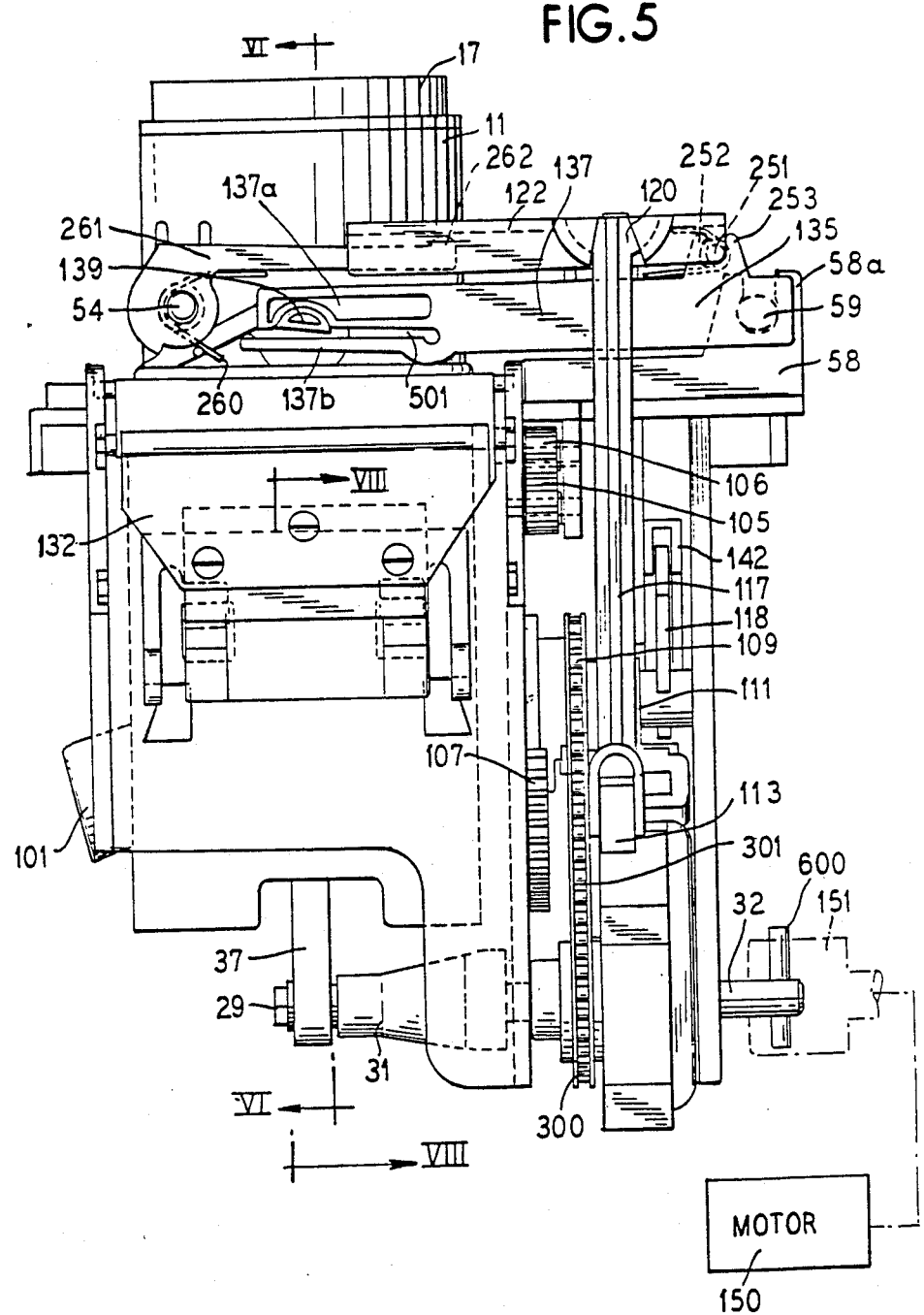
FIG. 5 is a partially cut-away side view of the machine.
Figure 6:
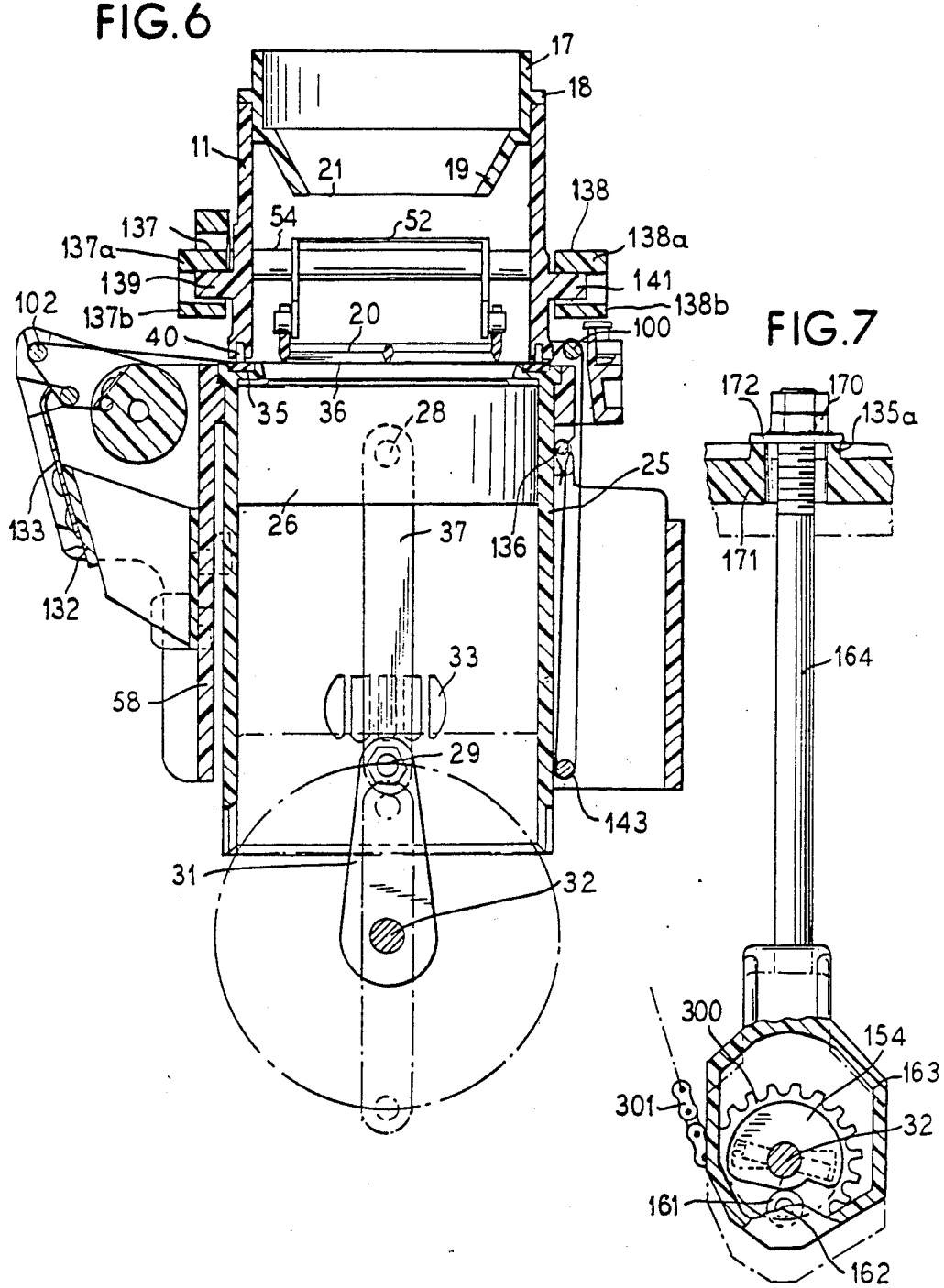
FIG. 6 is a sectional view taken on line VI—VI in FIG. 5 and illustrates the mechanism for controlling the movement of the upper brewing chamber and the filter material.

FIGS. 2 through 9 disclose the mechanism of the invention. As shown in FIGS. 4 and 6, the top of the lower brewing chamber 25 supports the filter material 36. The filter material 36 may be a screening fabric type such as polyester monofilament number HD7-75 or HD7-63 which is available from TETKO Inc., 420 Saw Mill River Road, Elmsford, N.Y. 10523.

The lower chamber 25 is cylindrical-shaped and a piston 26 is mounted therein and is connected by wrist pin 28 to a piston rod 37 which is connected by a pin 29 to a crank arm 31 mounted on drive shaft 32 which is driven in a single direction to actuate the machine by a suitable driving motor 150. The upper brewing chamber 11 may be square, rectangular or round in shape but in the illustrated example, is generally square and has the funnel 17 which has an extension 18 that is mounted to the top of the upper chamber 11 and has a downward funnel portion 19 which terminates at an opening 21 for supplying the hot water and beverage material as, for example, coffee grounds to the brewing chambers. Above the top of the lower chamber 25, the flexible filter material 36 is mounted as shown, for example, in FIGS. 4 and 6. The filter material 36 is sealed in the brewing chamber by a lower gasket 35 mounted in the upper portion of the lower chamber 25 and a second gasket 40 mounted in the lower edge of the upper chamber 11. Molded into gasket 35 is a screen material to prevent grounds from accidently entering the lower chamber 25. A filter material hold down grid 20 engages the filter material 36 during the brewing cycle and has three longitudinal members 42, 44 and 43 as illustrated in FIG. 2 and five transverse members 41, 46, 47, 48 and 49. The hold down grid 20 is connected to a pivotally supported hold down lever 52 by bearings 51 and 51a and brackets 53 attached to the grid hold down member 20 as shown in FIGS. 2 and 4.

In the present invention, the upper brewing chamber 11 is opened and unsealed from the lower brewing chamber 25 to allow the strip of filter material 36 to be withdrawn from the brewing chamber so as to remove the grounds 101 from the previous cup of coffee from the machine. This is generally illustrated in FIG. 9 wherein the strip 36 of filter material has one end which passes over a roller 102 to a reel 103 mounted on the frame of the machine with a shaft 104. The shaft 104 carries a gear 106 which is in mesh with an idler gear 105 mounted on shaft 99 which meshes with a segment gear 107 which drives the reel 103. The segment gear 107 is mounted on shaft 108 which carries a sprocket 109 and cams 111 and 118. Cam 111 engages a cam follower 112 mounted on an arm 113 which is pivotally supported as illustrated in FIG. 3.

The end 116 of arm 113 is bent as shown and is received in an opening 114 in frame 58 which serves as a pivot point for moving the filter hold-down member 20. The arm 113 is pivotally connected to an arm 117 which has its upper end 120 connected to member 122, as shown in FIG. 5. Member 122 has a pin 251 which is received in a recess formed between uprights 252 and 253 formed on member 135 which is pivotally supported on shafts 59 and 59a of the frame 58.

Member 122 has an upper surface against which the end 262 of rocker arm 261 bears. Rocker arm 261 is pivotally supported on shaft 54 which has a flat portion as shown in FIG. 4. Lever arm 52 is carried on shaft 54 and has a free end with a pin 51 which engages brackets 700 and 701 that are attached to hold down member 20.

Thus, when push rod 117 is pulled down by cam 111 the hold down member 20 is held down.

Cam 118 engages a cam follower 119 mounted on a lever 142 which is pivotally mounted with a pin 144 as shown in FIG. 3. Lever 142 carries a rod 143 and when cam follower 119 rises on cam 118, filter material 36 is positively pulled by rod 143.

As shown in FIG. 9 the filter web 36 is connected to the reel 103 by pin 131 such that when gear 106 is driven by idler gear 105 which is in turn driven by segment gear 107 the reel 103 pulls the filter material 36 out of the brewing chamber such that the ground residue 101 from the previous brewed cup is scraped off of the filter material 36 by a scraper 132 which has an end 133 that removes the residue 101 and the residue falls into a container, not shown. The other end of the filter material 36 passes over roller 100 and the filter material 36 passes around the rod 143 and has its second end attached to a pin 136 as best shown in FIG. 9.

After the segment gear 107 has driven the filter material 36 so that the residue 101 has been scraped from the filter material, the segment gear which rotates in a counterclockwise direction relative to FIGS. 3 and 9 disengages the gear 105 which releases the reel 103 so that the rod 143 will pull the filter material through the brewing chamber so that the rod 143 takes the position shown in dotted line in FIG. 9.

The upper brewing chamber is mounted on bifabricated arms 137a and 137b and 138a and 138b which are attached to a pivoted member 135 as shown in FIG. 5. A pair of stub shafts 139 and 141 are connected to the upper brewing chamber 11 and are pivotally mounted in the end of arms 137 and 138 as shown in FIG. 9. The stub shafts 139 and 141 are formed with flat spots as illustrated in FIG. 5 and are received in slots 501 formed in the arms 137 and 138. The rear end of member 135 is pivotally connected to the frame by shafts 59 and 59a as illustrated in FIG. 2 which extend through frame members 58a and 58b connected to the frame 58 of the machine. A spring 201 is mounted on a stub shaft 59c and has ends 202 and 203 so as to bias the member 135 and the arms 137 and 138 upwardly. A shaft 164 passes through member 135a as illustrated in FIG. 4 and a washer assembly 172 is mounted on the extensions 135a and nut 170 locks the upper end of shaft 164 to the member 135.

A center portion 171 of member 135 carries the projection 135a as illustrated in FIGS. 3 and 4.

Figure 7:
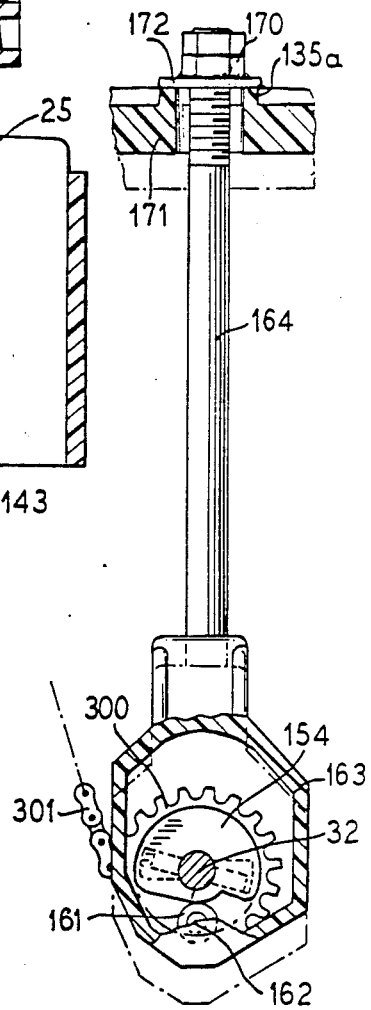
FIG. 7 is a side view of the brew hold down drive for the beverage machine.

As shown in FIG. 7, the shaft 164 has a hollow enlarged portion 163 at its lower end and carries a cam follower 161 mounted on shaft 162 that is connected to the portion 163. Cam follower 161 engages a cam 154 mounted on shaft 32 which as illustrated in FIG. 5 is driven by the motor 150 through a coupling member 151 and pin 600. A sprocket 300 is also mounted on shaft 32 as illustrated in FIG. 7 and FIG. 5 and drives a chain belt 301 which drives a sprocket 109 mounted on shaft 108 illustrated in FIG. 3. As illustrated in FIG. 3, sprocket 109 is mounted on shaft 108 and carries cams 111 and 118 as well as segment gear 107 which engages gear 105 to drive the filter material 36 on to reel 103. Cam 111 engages cam follower 112 in pivoted arm 113 so as to drive the arm 117 to actuate the filter medium hold-down lever as described. Cam 118 engages cam follower 119 in pivoted lever 142 and rod 143 returns the filter material 36 from reel 103.

The shaft 32 also drives the crank arm 31 which is connected by a pivot pin 29 to piston rod 37 which is pivotally connected by pivot 28 to the piston 26 as illustrated in FIGS. 6 and 8, for example.

In operation, when the dispenser machine is energized, the motor 150 illustrated in FIG. 5 will drive the drive shaft 32 in one direction and coffee will be dispensed from the holder 121 and hot water from the reservoir 123 into the upper brewing chamber 11. At this time, the grid hold down 20 engages the filter material 36 through the action of roller 112 on cam 111 and the rest of the linkage to hold it down and the piston 26 moves upwardly in the cylinder 25 forcing air through the filter 36 to agitate the hot water and coffee grounds in the upper chamber 11 so as to brew coffee rapidly and efficiently. During this time, the upper brewing chamber 11 is firmly held against the lower brewing chamber, so the gaskets 40 and 35 seal the brewing chamber. When the piston has passed top dead center, the filter hold down 20 is released by the action of roller 112 on cam 111 which allows the arm 117 to rise. A spring 254 is mounted on pin 251 so as to bias the member 122 upwardly. As 117 is attached to arm 122, this permits arm 261 to rise as it is biased by spring 260. Thus hold down 20 is allowed to also rise on cam 111 acting through roller 112 and the linkage associated with same before all the grounds settle on it. Then the piston moves downwardly in the cylinder 25 which sucks the brewed coffee through the filter material 36 into the lower brewing chamber on to the top of the piston 26. As piston 26 continues downwardly in the cylinder 25, it passes the slots 33 which allow the brewed coffee to pass therethrough. The push rod 164 moves upward due to the action of the cam 154 on the cam 154 on the cam follower roller 161 which causes the upper brewing chamber 11 to be raised due to the biasing spring 201. When the piston passes bottom dead center (pouring out the brewed coffee) and begins its upward motion, the grid 20 is lowered to hold down the filter. It is held in this position until the piston reaches top dead center. When said grid is raised, it remains there for the balance of the brew cycle. The purpose of this is to have the grid away from the filter when the patty is formed. With the grid hold down 20 in the up position and the upper brewing chamber 11 in the upper position the segment gear 107 engages the gear 105 which engages gear 106 to move the filter material 36 and used coffee grounds 101 out of the brewing chamber past the scraper 132 and the grounds are removed and fall into a suitable receptacle. Then the segment gear 107 passes beyond the gear 105 and the rod 143 returns the filter material 36 to the brewing chamber and the upper brewing chamber 11 and the hold down grid 20 are returned to the down position ready for the next cycle with the piston 26 in the lower position.

FIGS. 10 and 11 illustrate a modification wherein the reuseable filter material 36 can be replaced with a roll of filter paper and wherein the machine of the invention can be modified to use the roll of filter paper such that each portion of the filter paper is only used one time. The filter paper 36a passes between the roller 103 which is driven by the gear 106 and a roller 602 supported by shaft 603. The roller 602 is supported on arm 604 which has a portion 605 which engages a cam 606 rotating on shaft 108. When roller 602 is out of engagement with reel 103 the paper 36a is not driven.

It is seen that this invention provides an improved brewing machine wherein a large portion of the cycle is used for brewing the beverage such as coffee and there is a very limited time allowed for raising the upper brewing chamber and the hold down grid and removing the grounds and filter material out of the brewing chamber to clean it and then return the filter to the brewing chamber and again lower the upper brewing chamber and the hold down grid. The present invention comprises a substantially improvement in brewing machines of the prior art.

Figure 12:
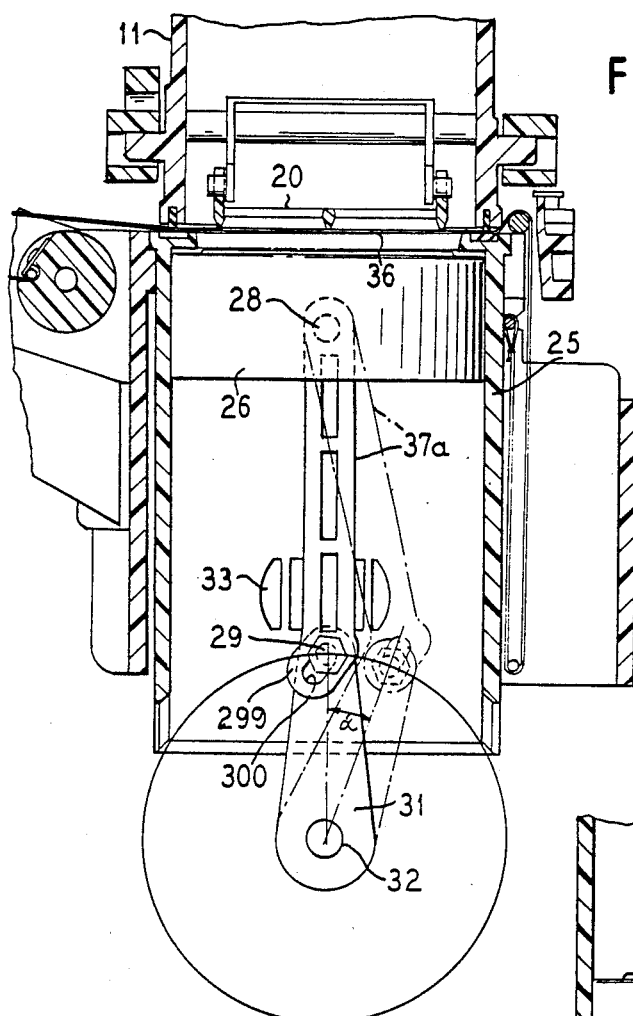
FIG. 12 is a sectional view showing a modified driving link.
Figure 13:
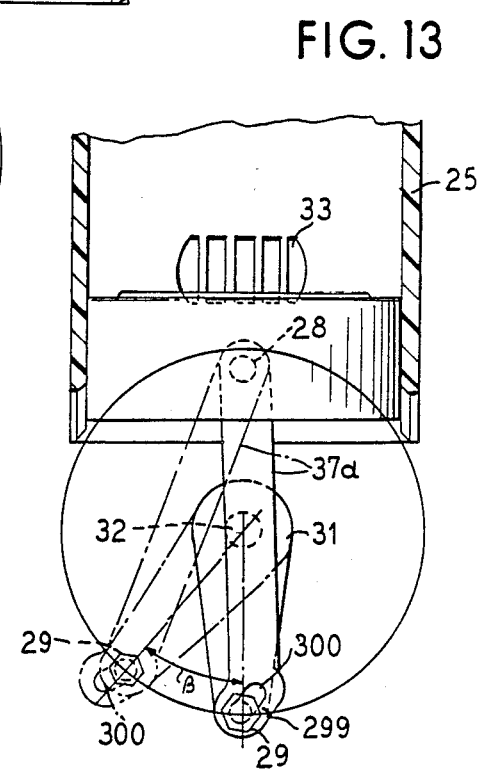
FIG. 13 is a fragmental view of the device of FIG. 12 in a different position.

FIGS. 12 and 13 illustrate a modification of the invention wherein the connecting rod is modified. The connecting rod 37a has a lower portion 299 which is formed with a slot 300 which is at about a 45 degree angle relative to horizontal so that the pin 29 can move in the slot. This causes the piston to remain at the bottom position shown in FIG. 13 and in the top position shown in FIG. 12 for a longer time than the other embodiment which does not have the slot 300. This allows the piston to momentarily stop at the top and the bottom of the stroke which results in an improved coffee brewer due to the fact that it allows more time for the water and coffee to enter the brew chamber before starting the suction cycle and also more time at the bottom of the stroke to pour out the coffee without changing the total cycle time.

In the invention, improved extraction results from the brewer when the coffee and water are subjected to the greatly increased air which passes through it during the agitation period. Due to agitation of grounds, oxygenation of the mixture or a combination of both, by adding so high a volume of air during the brewing process, increased extraction results. Any method of providing the extra air can be used such as a compressor or other device.

The following results were achieved:

| Brewer | % Extraction | % Solids in Solution |
| --- | --- | --- |
| Prior Art | 13.3 | .78 160 ml-hot water |
| Invention | 15.0 | .90 |
| Improvement | 12.78% | 15.0% 8 g. coffee |
| Prior Art | 13% | .81% 250 ml-hot water |
| Invention | 16% | .96% 13.6 g. coffee |
| Improvement | 23% | 15% |

Thus, the invention results in substantial increases in percent of extraction and percent of solids in solution.

Although the invention has been described with respect to preferred embodiments, it is not to be so limited as changes and modifications can be made which are within the full intended scope of the invention as defined by the appended claims.

I claim as my invention:

1. A beverage brewing machine comprising in combination,
    (a) an upper brewing chamber adapted to receive hot water and a beverage material and having an open lower end,
    (b) a lower chamber with an open upper end normally in registration and sealed with said open lower end,
    (c) a filter mounted between said upper and lower chambers and said chambers normally clamping said filter therebetween,
    (d) a reciprocable piston mounted in said lower chamber for forcing air through said filter into said upper chamber and for withdrawing brewed beverage through said filter, (e) means for separating and sealing said upper and lower chambers so as to unclamp said filter, (f) hold-down means mounted within the upper brewing chamber movable between a first position wherein the hold-down means presses down on the filter at least when the piston forces air upwardly through said filter and a second position wherein the hold-down means is released from the filter, and wherein said piston is driven by a connecting rod which has one end pivotally connected thereto, a crank arm pivotally connected to the second end of said connecting rod, a driving shaft connected to said crank arm, and a driving means connected to said driving shaft and a loose connection between said piston and said driving shaft such that said reciprocable piston stays longer at the top and bottom of its stroke than it would it would if there were no loose connection between said piston and said driving shaft.

2. A beverage brewing machine according to claim 1 wherein said loose connection is between said second end of said connecting rod and said crank arm 3. A beverage brewing machine according to claim 1 wherein said loose connection is formed by a slot in said second end of said connecting rod and a pivot pin which is mounted on said crank arm and is received in said slot.

4. A beverage brewing machine according to claim 2 wherein said connecting rod has a longitudinal axis and said slot extends at an angle other than zero to said longitudinal axis.

* * * * *